US012719224B2

(12) United States Patent
Dong et al.

(10) Patent No.: US 12,719,224 B2
(45) Date of Patent: Aug. 25, 2026

(54) CONNECTOR AND CONNECTOR ASSEMBLY

(71) Applicants: Measurement Specialties (Chengdu) Ltd, Chengdu (CN); Tyco Electronics (Shanghai) Co., Ltd., Shanghai (CN)

(72) Inventors: Aibing (Alan) Dong, Shanghai (CN); Liqiang (Gino) Yao, Shanghai (CN); Yong (Chris) Wang, Shanghai (CN); Dong Ding, Chengdu (CN); Peng Zhang, Chengdu (CN); Yingchun (David) Wang, Shanghai (CN); Haibo (Robert) Gan, Shanghai (CN)

(73) Assignees: Measurement Specialties (Chengdu) Ltd., Chengdu (CN); Tyco Electronics (Shanghai) Co., Ltd., Shanghai (CN)

( * ) Notice: Subject to any disclaimer, the term of this patent is extended or adjusted under 35 U.S.C. 154(b) by 353 days.

(21) Appl. No.: 18/448,197

(22) Filed: Aug. 11, 2023

(65) Prior Publication Data

US 2024/0055812 A1 Feb. 15, 2024

(30) Foreign Application Priority Data

Aug. 11, 2022 (CN) ......................... 202222110577.0

(51) Int. Cl.

| | |
|---|---|
| ***H01R 13/66*** | (2006.01) |
| ***G01K 1/12*** | (2006.01) |
| ***G01K 1/143*** | (2021.01) |
| ***H01R 13/631*** | (2006.01) |

(52) U.S. Cl.

CPC ........... *H01R 13/6683* (2013.01); *G01K 1/12* (2013.01); *G01K 1/143* (2013.01); *H01R 13/631* (2013.01)

(58) Field of Classification Search

CPC .............. H01R 13/6683; H01R 13/631; H01R 13/187; H01R 13/5202; H01R 13/533; H01R 13/6277; H01R 13/639; G01K 1/12; G01K 1/143; G01K 1/08; G01K 1/16; G01K 1/14; Y02T 10/70; Y02T 10/7072

See application file for complete search history.

(56) References Cited

U.S. PATENT DOCUMENTS

| | | | | |
|---|---|---|---|---|
| 2019/0162603 | A1* | 5/2019 | Lyon | B60L 53/14 |
| 2020/0187306 | A1* | 6/2020 | Pan | H05B 3/42 |
| 2021/0211022 | A1* | 7/2021 | Schmitt | H02K 3/28 |
| 2024/0055812 | A1* | 2/2024 | Dong | G01K 1/12 |
| 2024/0085245 | A1* | 3/2024 | Ding | G01K 1/16 |

FOREIGN PATENT DOCUMENTS

| | | | |
|---|---|---|---|
| CN | 210692864 | U * | 6/2020 |
| CN | 214625556 | U * | 11/2021 |

* cited by examiner

*Primary Examiner* — Abdullah A Riyami
*Assistant Examiner* — Nader J Alhawamdeh
(74) *Attorney, Agent, or Firm* — Barley Snyder

(57) ABSTRACT

A connector assembly comprises a connector, a mating connector, and a locking device detachably mounted on the mating connector and adapted to lock the connector and the mating connector in a mating state. The connector includes a housing having an insertion hole, a terminal provided in the housing, and a temperature sensor inserted into the insertion hole of the housing and in thermal contact with the terminal to detect the temperature of the terminal.

21 Claims, 14 Drawing Sheets

CONNECTOR AND CONNECTOR ASSEMBLY

CROSS-REFERENCE TO RELATED APPLICATIONS

This application claims the benefit of Chinese Patent Application No. CN202222110577.0 filed on Aug. 11, 2022, in the State Intellectual Property Office of China, the whole disclosure of which is incorporated herein by reference.

FIELD OF THE INVENTION

The present invention relates to a connector and a connector assembly including the connector.

BACKGROUND

With the rapid development of new energy technologies, the demand for high current connectors for energy storage applications is growing. Known high current connectors for energy storage applications include receptacle connectors and plug connectors. Energy storage cabinets in existing energy storage systems typically include several independent battery boxes connected in series through these high current connectors. Each battery box and serial connector must be strictly temperature controlled (e.g., kept below 45 degrees) so as to prevent or reduce the risk of fire and combustion accidents that often occur due to high temperatures. As the most important link for the interconnection of energy storage battery boxes, the high current connector plays an important role in ensuring safe and efficient operation of these systems.

At present, the existing high current connectors used in energy storage systems have several shortcomings. For example, the high current connectors do not have their own temperature sensors, and thus cannot monitor the connector temperature connected to the battery box in real time. Further it is inconvenient or difficult to unlock the connectors after the male and female terminals are mated, as there is no quick-lock function or the quick lock function is unreasonably difficult to operate. Existing connectors also lack finger touch prevention features and are unable to meet IP67 waterproof performance. Even further still, existing connectors cannot be rotated 360 degrees before mutual mating occurs, or cannot be rotated after mutual mating, and their structure or form is typically not compact.

Improved high current connectors suitable for use in energy storage applications are desired.

SUMMARY

According to an embodiment of the present disclosure, a connector comprises a housing having an insertion hole, a terminal provided in the housing, and a temperature sensor inserted into the insertion hole of the housing and in thermal contact with the terminal to detect the temperature of the terminal.

According to another embodiment of the present disclosure, a connector assembly comprises a connector, a mating connector, and a locking device detachably mounted on the mating connector and adapted to lock the connector and the mating connector in a mating state. The connector includes a housing having an insertion hole, a terminal provided in the housing, and a temperature sensor inserted into the insertion hole of the housing and in thermal contact with the terminal to detect the temperature of the terminal.

BRIEF DESCRIPTION OF THE DRAWINGS

The invention will now be described by way of example with reference to the accompanying Figures, of which.

DETAILED DESCRIPTION OF THE EMBODIMENTS

Figure 1:
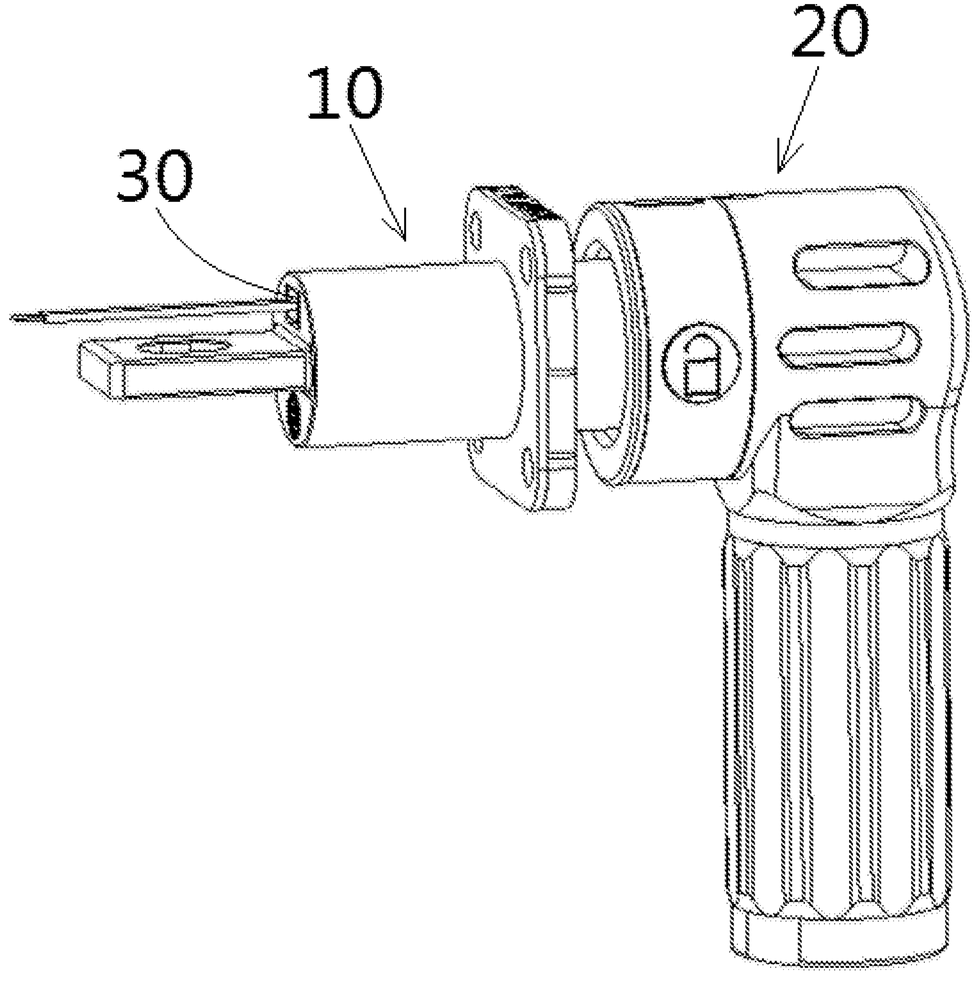
FIG. 1 is an illustrative perspective view of a connector assembly according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to one embodiment of the present disclosure, a connector comprises a housing having an insertion hole, a terminal provided in the housing, and a temperature sensor inserted into the insertion hole of the housing and in thermal contact with the terminal to detect the temperature of the terminal.

According to another embodiment, a connector assembly comprises the above connector, a mating connector suitable for mating with the connector, and a locking device detachably mounted on the mating connector and configured to lock the connector and the mating connector in a mating state. The locking device includes an elastic ring, and a locking member fixed on the elastic ring. When the elastic ring is pressed radially from both sides of it, the elastic ring is elastically deformed from an initial state to a pressed state. When the elastic ring is in the initial state, the locking member is in a locking position engaged with the connector to lock the connector and the mating connector in the mating state. When the elastic ring is in the pressed state, the locking member is in an unlocking position separated from the connector to allow the connector to be separated from the mating connector.

According to yet another embodiment of the present disclosure, a connector comprises a housing, and a locking device detachably mounted on the housing for locking the connector to a mating connector. The locking device includes an elastic ring, and a locking member fixed on the elastic ring. When the elastic ring is pressed radially from both sides of it, the elastic ring is elastically deformed from an initial state to a pressed state. When the elastic ring is in the initial state, the locking member is in a locking position engaged with the mating connector to lock the connector and the mating connector in a mating state. When the elastic ring is in the pressed state, the locking member is in an unlocking position separated from the mating connector to allow the connector to be separated from the mating connector.

Figure 2:
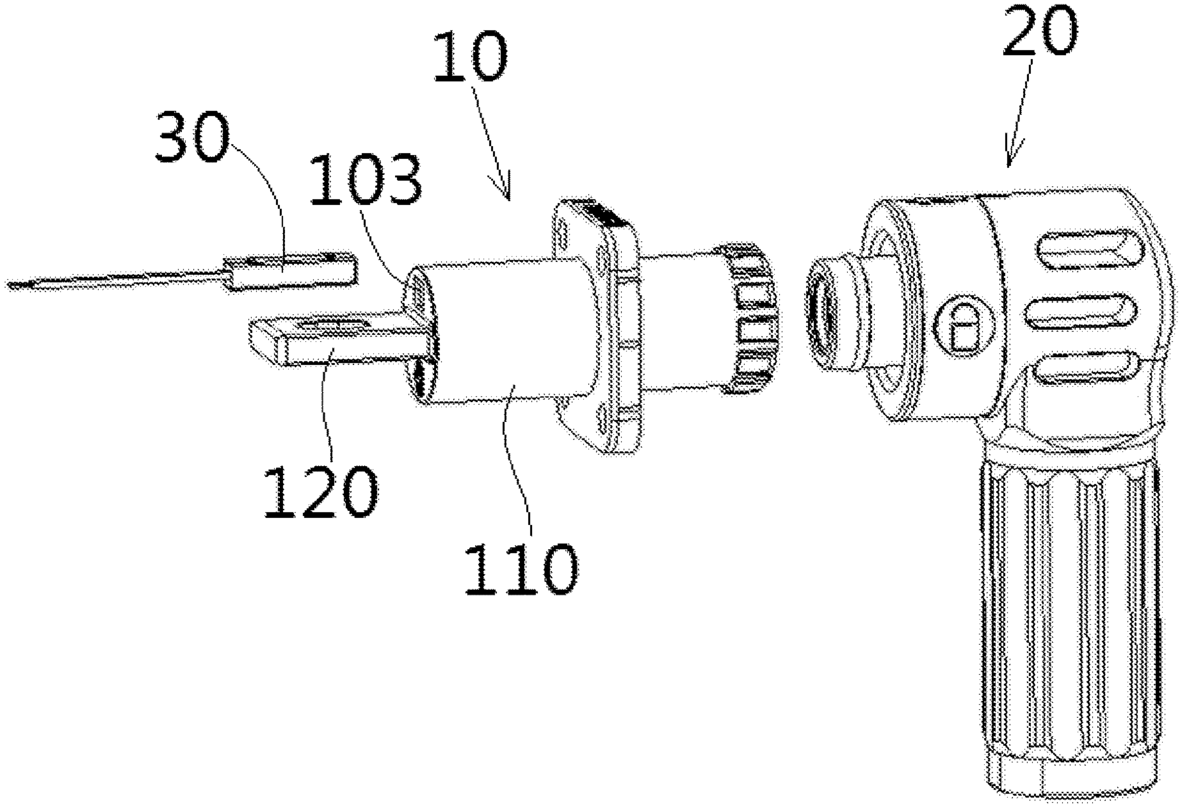
FIG. 2 is an illustrative exploded view of a connector assembly according to an exemplary embodiment of the present invention.
Figure 3:
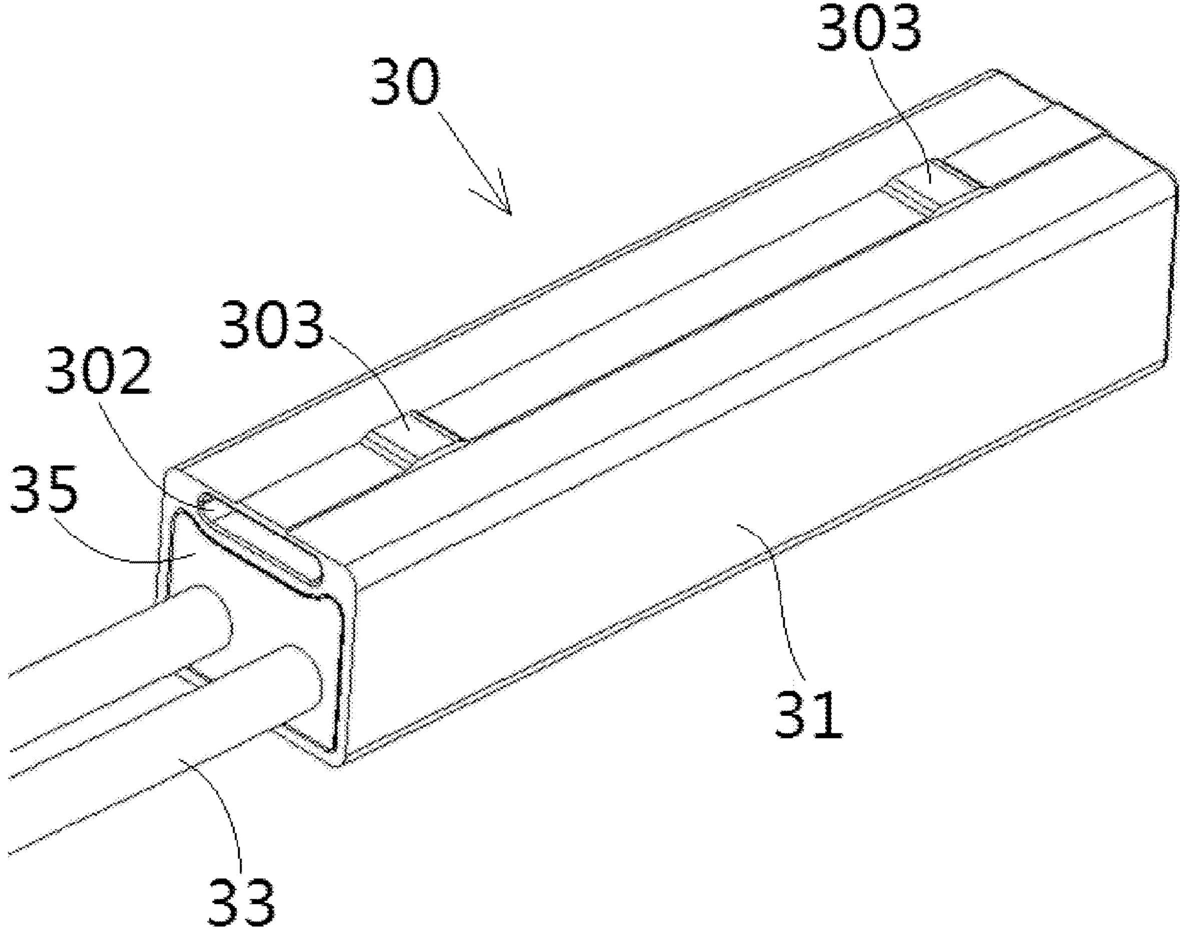
FIG. 3 is an illustrative perspective view of a temperature sensor according to an exemplary embodiment of the present invention.
Figure 4:
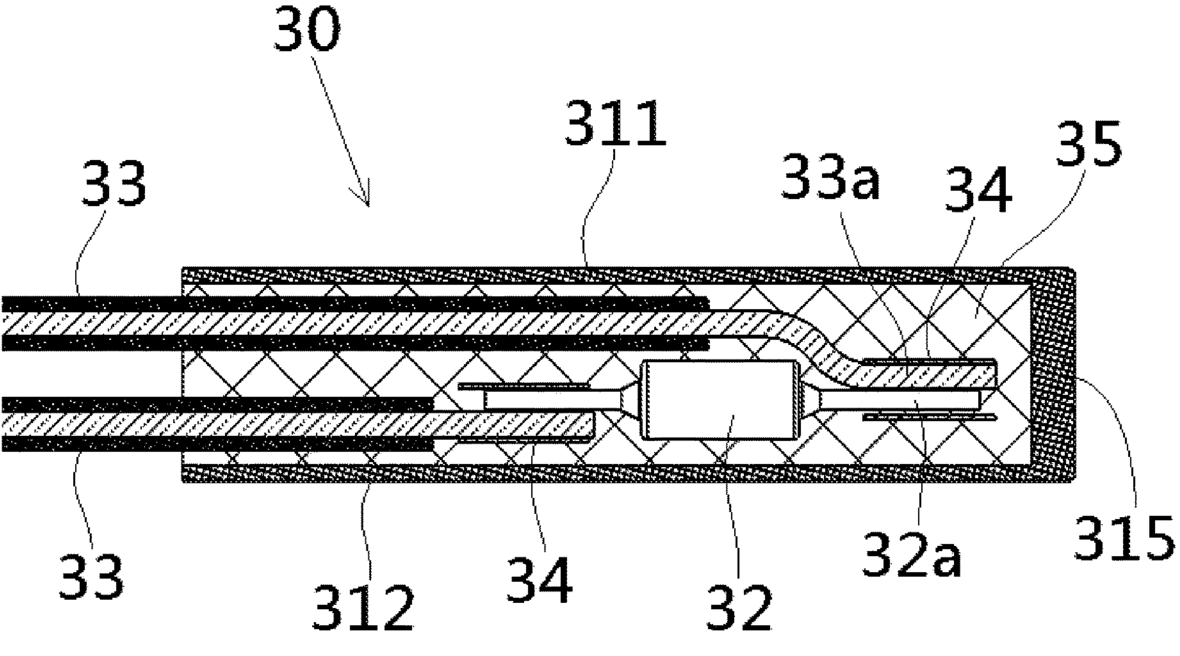
FIG. 4 is a longitudinal sectional view of a temperature sensor according to an exemplary embodiment of the present invention.
Figure 5:
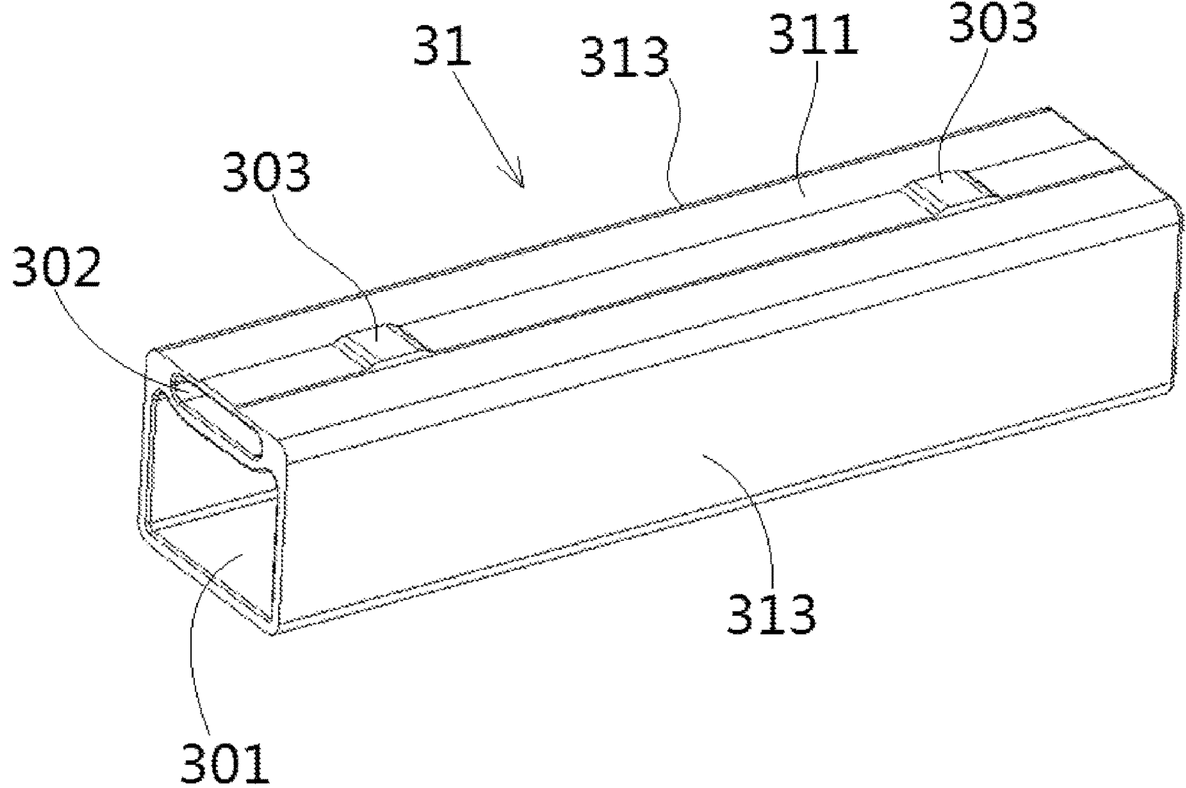
FIG. 5 is an illustrative perspective view of a case of a temperature sensor according to an exemplary embodiment of the present invention.
Figure 6:
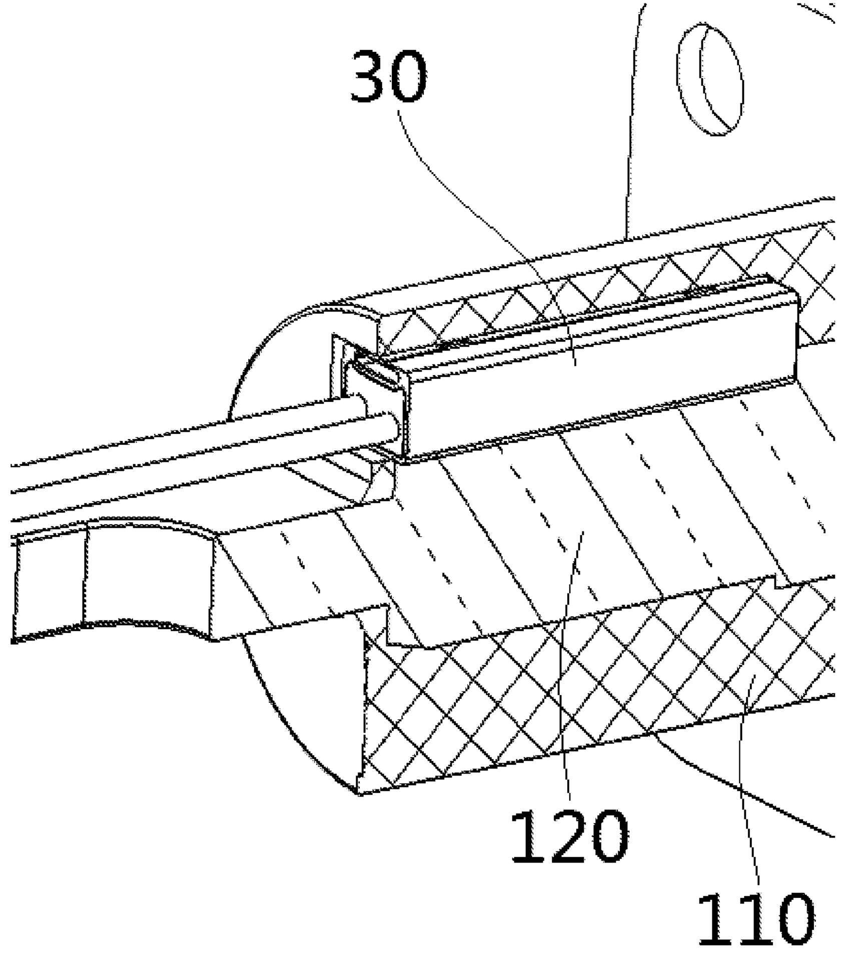
FIG. 6 is a partially enlarged sectional view of a connector according to an exemplary embodiment of the present invention.

FIG. 1 is an illustrative perspective view of a connector assembly according to an exemplary embodiment of the present invention. FIG. 2 is an illustrative exploded view of a connector assembly according to an exemplary embodiment of the present invention. FIG. 3 is an illustrative perspective view of a temperature sensor 30 according to an exemplary embodiment of the present invention. FIG. 4 is a longitudinal sectional view of the temperature sensor 30 according to an exemplary embodiment of the present invention. FIG. 5 is an illustrative perspective view of the case 31 of the temperature sensor 30 according to an exemplary embodiment of the present invention. FIG. 6 is a partially enlarged sectional view of a connector 10 according to an exemplary embodiment of the present invention.

Referring generally to FIGS. 1-6, in an exemplary embodiment of the present invention, the connector 10 comprises a housing 110, a terminal 120 and the temperature sensor 30. The housing 110 has an insertion hole 103. The terminal 120 is arranged in the housing 110. The temperature sensor 30 is inserted into the insertion hole 103 of the housing 110 and is in thermal contact with the terminal 120 to detect the temperature of the terminal 120.

The temperature sensor 30 includes a case 31, a temperature detecting element 32, two wires 33, and a thermal conductive resin 35. The case 31 has a receiving chamber 301. The temperature detecting element 32 is provided in the receiving chamber 301 of the case 31. The two wires 33 extend into the receiving chamber 301 of the case 31 and are electrically connected with the two pins 32*a* of the temperature detecting element 32 respectively. The thermal conductive resin 35 is filled in the receiving chamber 301 of the case 31. The case 31 is in direct physical contact with the surface of the terminal 120, so that the heat generated by the terminal 120 can be transferred to the temperature detection element 32. In order to improve the thermal conductivity, the thermal conductive resin 35 and the case 31 should be made of one or more high thermal conductive materials.

The case 31 includes a top wall 311, a bottom wall 312, a pair of side walls 313 and an end wall 315. The receiving chamber 301 is defined by the top wall 311, the bottom wall 312, the pair of side walls 313 and the end wall 315. The bottom surface of the bottom wall 312 of the case 31 is arranged directly against the surface of the terminal 120 to make direct physical contact with the terminal 120.

Two projections 303 are formed on the outer wall surface of the top wall 311 of the case 31. The protrusion 303 forms an interference fit with the hole wall of the insertion hole 103 of the housing 110 to apply a predetermined pressure on the temperature sensor 30. This pressure ensures reliable thermal contact between the bottom wall 312 of the case 31 and the surface of the terminal 120.

It should be understood that the present invention is not limited to the embodiments shown in the figures. For example, in another exemplary embodiment of the present invention, a projection may be formed on the hole wall of the insertion hole 103 of the housing 110. The projection forms an interference fit with the top wall 311 of the case 31 to apply a predetermined pressure on the temperature sensor 30, so as to ensure reliable thermal contact between the bottom wall 312 of the case 31 and the surface of the terminal 120.

A cavity 302 is formed in the top wall 311 of the case 31. The cavity 302 is located between the outer wall surface and the inner wall surface of the top wall 311 and extends through the top wall in a longitudinal direction of the case. The cavity 302 is adapted to allow the top wall 311 of the case 31 to undergo elastic deformation when pressed.

The insertion hole 103 is an axially extending blind hole formed in the case 31, and the outer wall surface of the end wall 315 of the case 31 is against the bottom surface of the insertion hole 103 of the housing 110. The terminal 120 includes a columnar end 121 adapted to be inserted into the mating terminal 220 and a plate end 122 for electrical connection with a bus bar. The bottom surface of the insertion hole 103 is positioned proximate to the columnar end 121 of the terminal 120.

The temperature sensor 30 also includes two crimping rings 34 The crimping rings 34 crimp the conductors 33*a* of two wire wires 33 to two pins 32*a* of the temperature detection element 32 respectively. In one embodiment, the temperature detection element 32 may be a negative temperature coefficient (NTC) thermistor.

Figure 7:
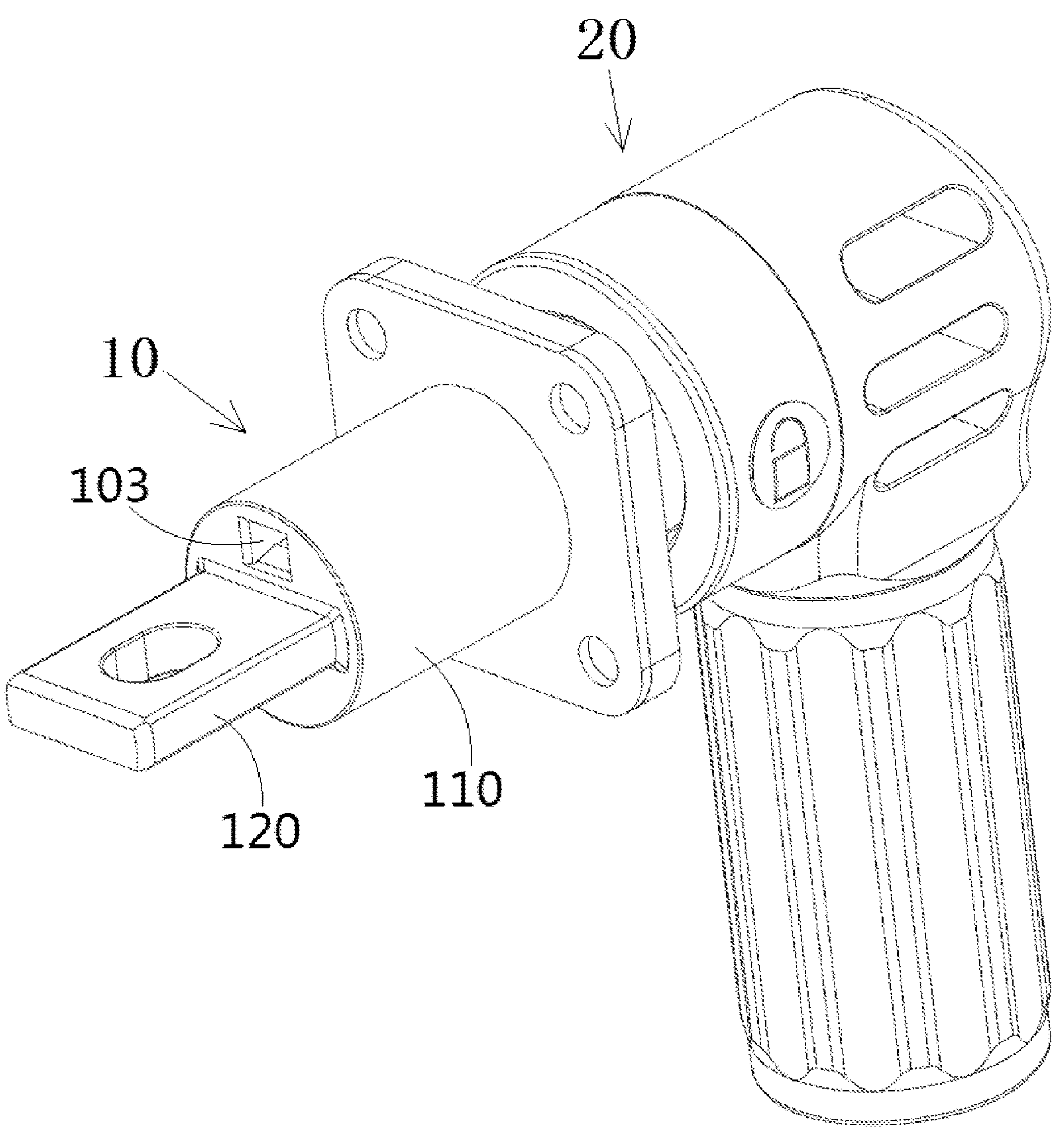
FIG. 7 is an illustrative perspective view of a connector assembly according to an exemplary embodiment of the present invention, in which a temperature sensor is not shown.
Figure 8:
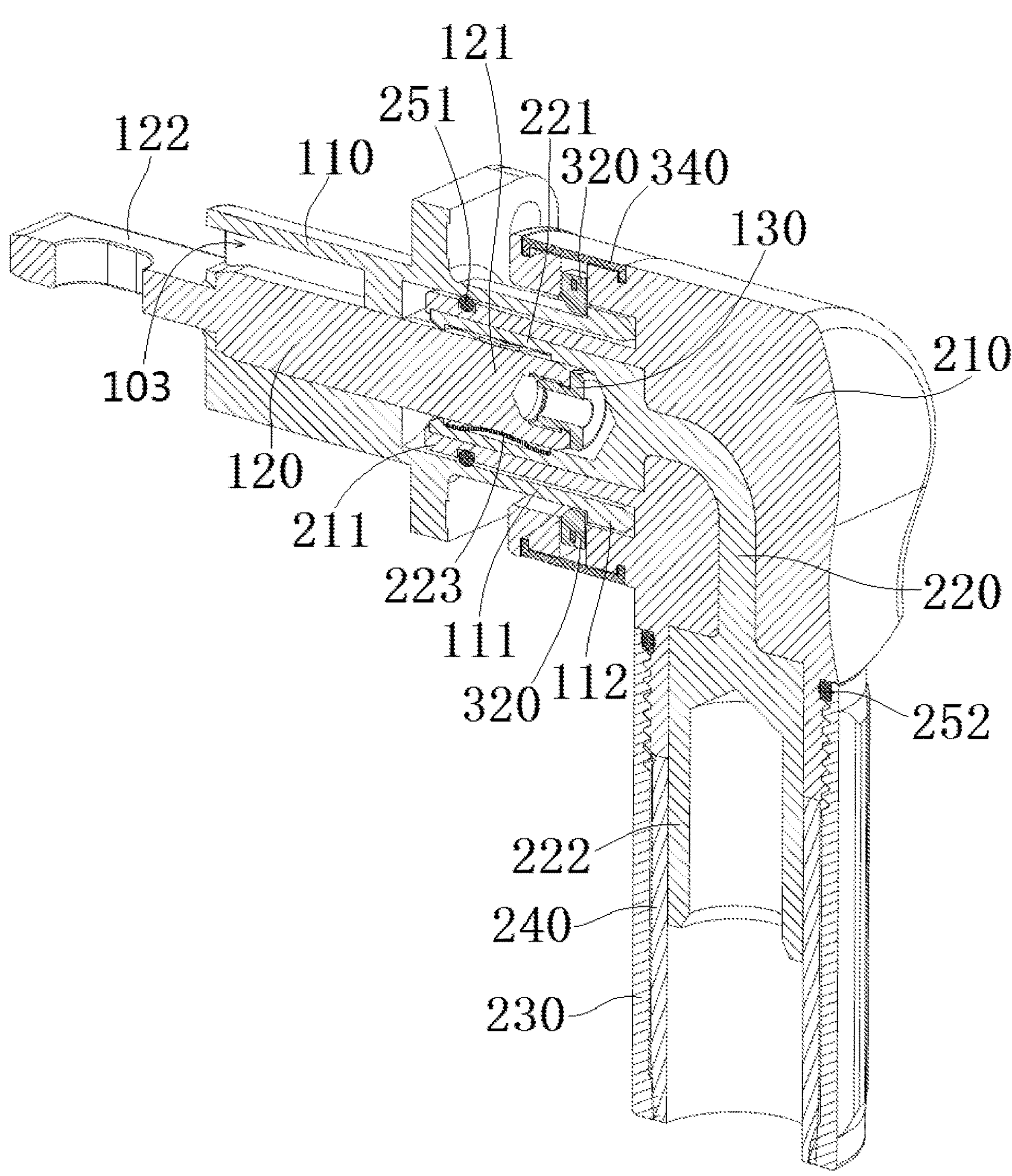
FIG. 8 is a longitudinal sectional view of a connector assembly according to an exemplary embodiment of the present invention, in which the temperature sensor is not shown.
Figure 9:
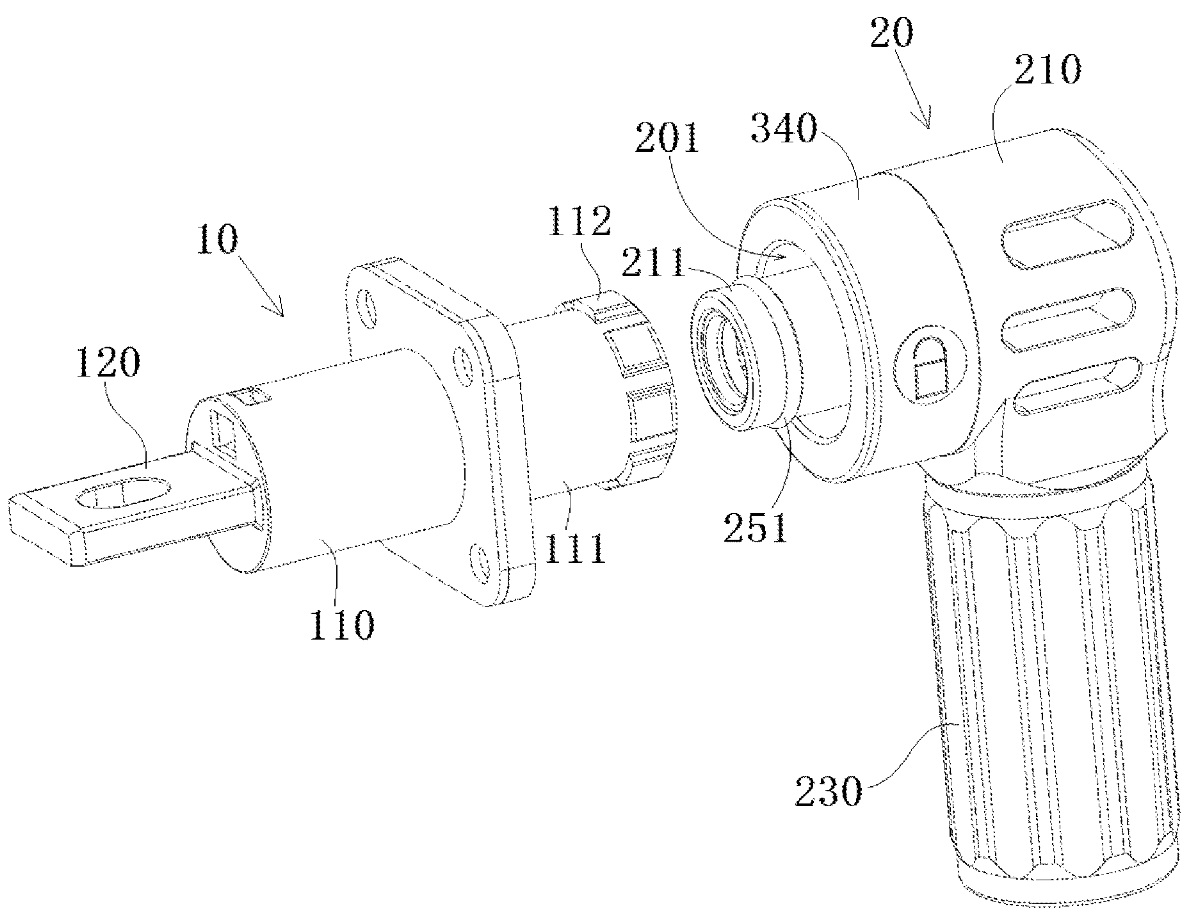
FIG. 9 is an illustrative exploded view of a connector assembly according to an exemplary embodiment of the present invention.

FIG. 7 is an illustrative perspective view of a connector assembly according to an exemplary embodiment of the present invention, in which the temperature sensor 30 is not shown. FIG. 8 is a longitudinal sectional view of a connector assembly according to an exemplary embodiment of the present invention, in which the temperature sensor 30 is not shown. FIG. 9 is an illustrative exploded view of a connector assembly according to an exemplary embodiment of the present invention.

As shown in FIGS. 7-9, the connector assembly includes the connector 10, a mating connector 20 and a locking device 300. The mating connector 20 is suitable for mating with the connector 10. The locking device 300 is detachably installed on the mating connector 20 to lock the connector 10 and the mating connector 20 in the mating state.

Figure 10:
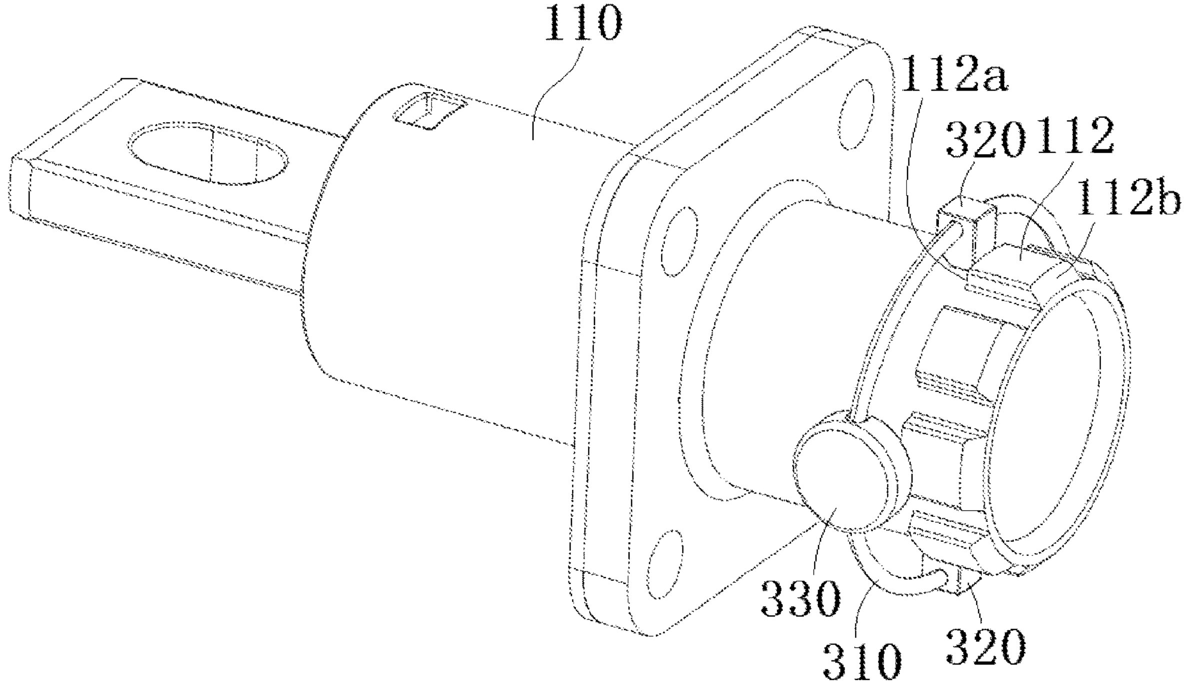
FIG. 10 is an illustrative perspective view of a connector and a locking device according to an exemplary embodiment of the present invention, wherein the locking device is in a locking position.
Figure 11:
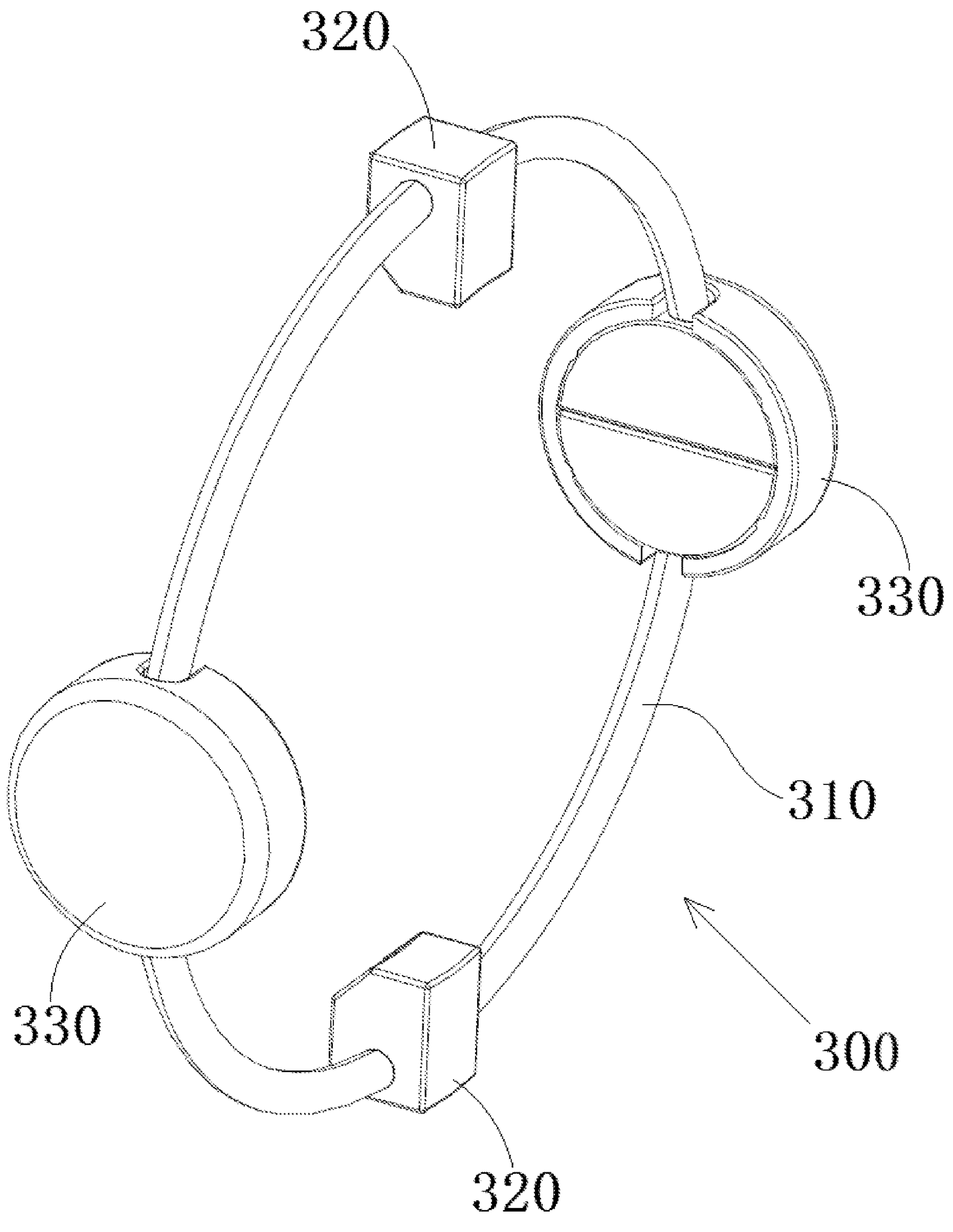
FIG. 11 is an illustrative perspective view of a locking device according to an exemplary embodiment of the present invention.
Figure 12:
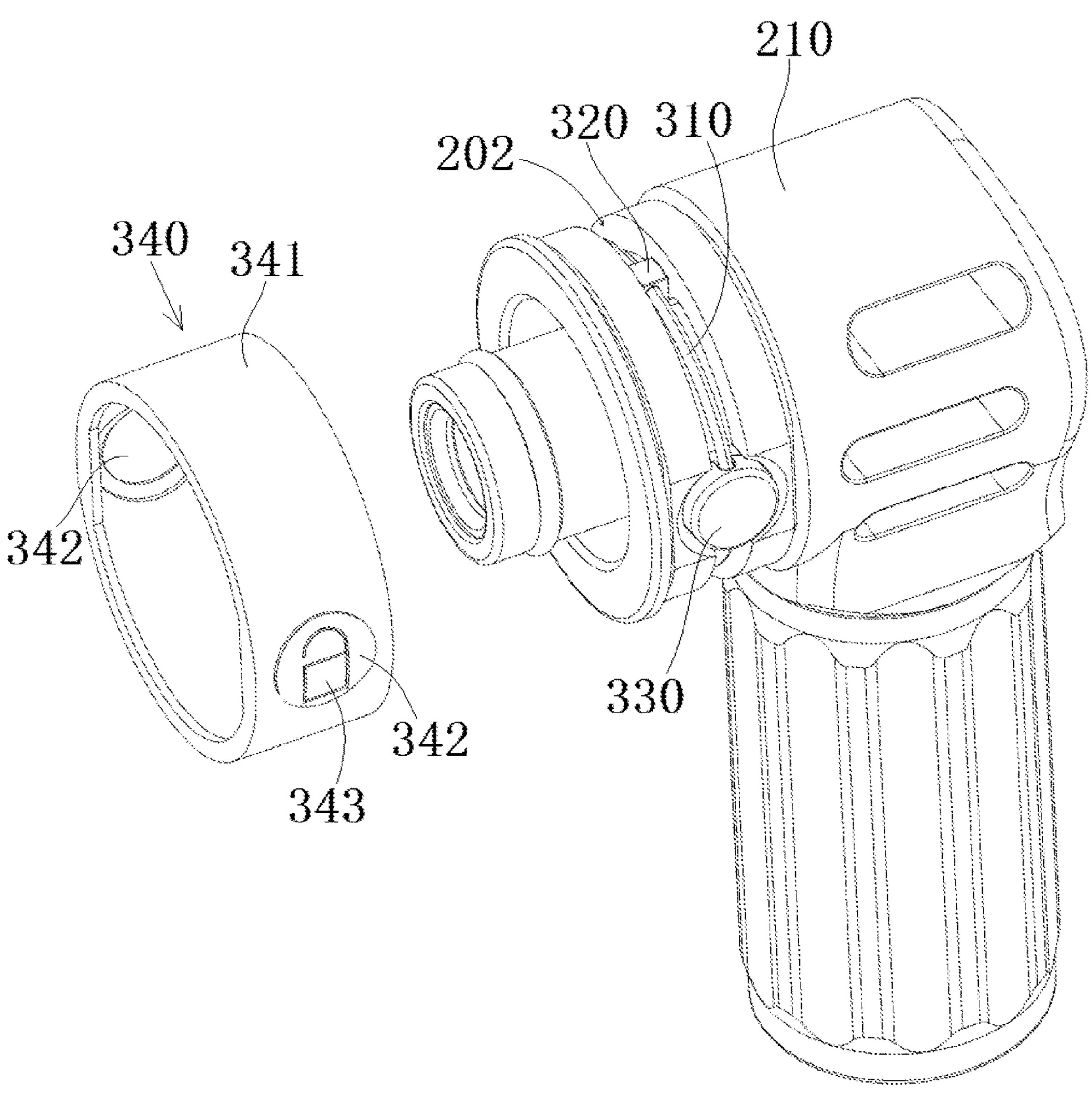
FIG. 12 is an illustrative perspective view of a mating connector according to an exemplary embodiment of the present invention, wherein the sealing sleeve of the locking device is in a state of separation from the mating housing.
Figure 13:
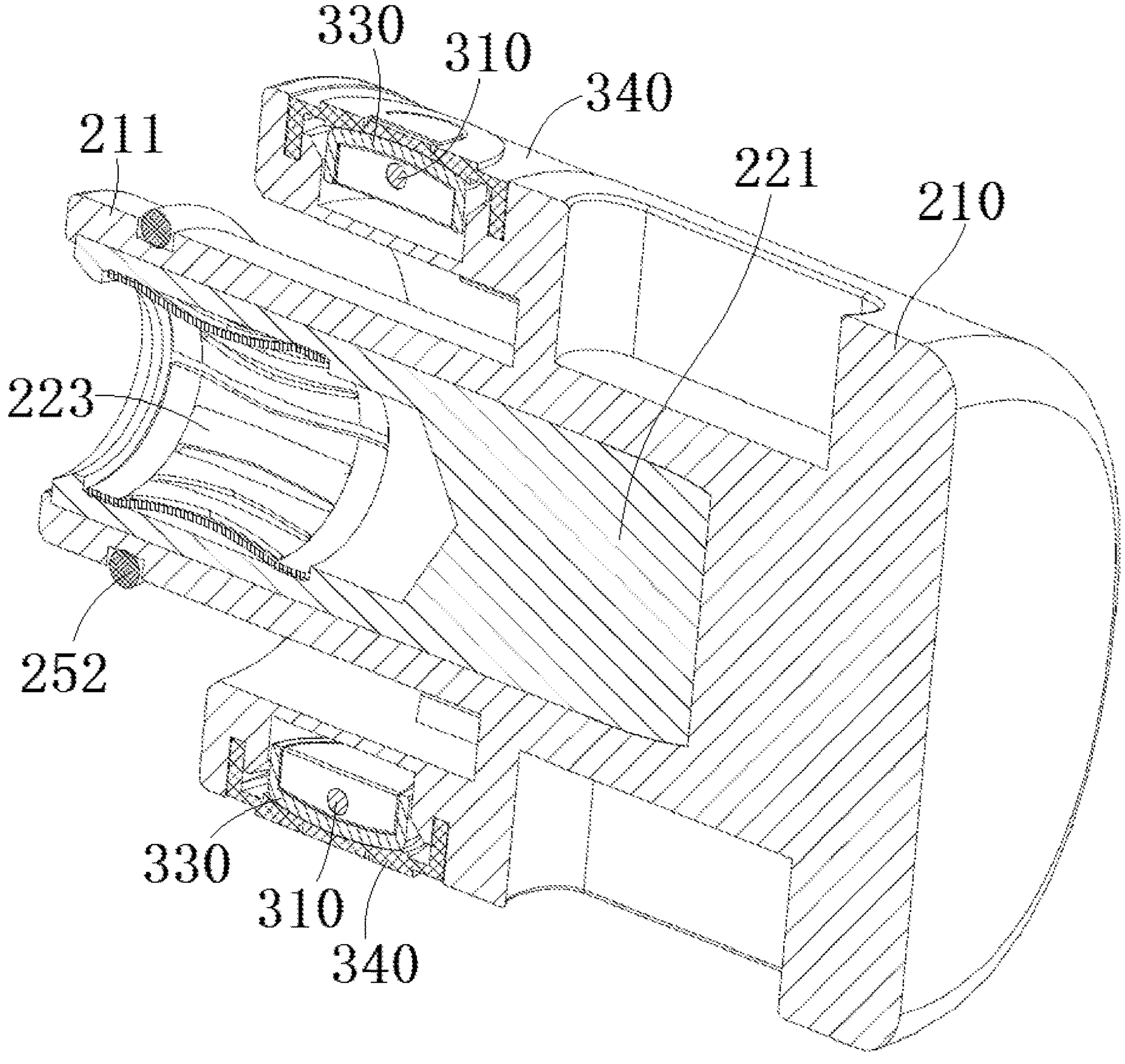
FIG. 13 is a sectional view of a mating connector according to an exemplary embodiment of the present invention.

FIG. 10 is an illustrative perspective view of the connector 10 and the locking device 300 according to an exemplary embodiment of the present invention, wherein the locking device 300 is in a locking position. FIG. 11 is an illustrative perspective view of the locking device 300 according to an exemplary embodiment of the present invention. FIG. 12 is an illustrative perspective view of the mating connector 20 according to an exemplary embodiment of the present invention, wherein a sealing element 340 of the locking device 300 is in a state of separation from a mating housing 210. FIG. 13 is a sectional view of the mating connector 20 according to an exemplary embodiment of the present invention.

Referring generally to FIGS. 7-13, the locking device 300 includes an elastic ring 310 and a locking member 320. The locking member 320 is fixed to the elastic ring 310. When the elastic ring 310 is pressed radially from both sides thereof, the elastic ring can be elastically deformed from an initial state to a pressed state. When the elastic ring 310 is in the initial state, the locking member 320 is in the locking position engaged with the connector 10 to lock the connector and the mating connector 20 in the mating state. When the elastic ring 310 is in the pressed state, the locking member 320 is in an unlocking position separated from the connector 10 to allow the connector to be separated from the mating connector 20.

The locking device 300 includes two locking members 320. The two locking members 320 are opposite to each other in one diameter direction of the elastic ring 310. The locking device 300 also includes two pressing members 330, which are fixed to the elastic ring 310 and opposite to each other in another diameter direction of the elastic ring perpendicular to the one diameter direction. In the illustrated embodiment, the pressing member 330 and the adjacent locking member 320 are separated by 90 degrees about the circumference of the elastic ring 310. When two pressing members 330 are pressed close to each other, the elastic ring 310 can be elastically deformed from the initial state to the pressed state. When the elastic ring 310 is elastically deformed to the pressed state, the two locking members 320 are moved in the direction away from each other, so that they can be moved to the unlocking position separated from the connector 10.

The connector 10 includes the housing 110 having a front end 111 and a plurality of key teeth 112 formed on the outer peripheral surface of the front end 111, and the terminal 120, which is provided in the housing. The mating connector 20 comprises the mating housing 210, an insertion chamber 201 and a plurality of key slots 212 formed on the inner peripheral wall of the insertion chamber, and a mating terminal 220 provided in the mating housing. When the front end 111 of the mating housing 110 is inserted into the insertion chamber 201 of the mating housing, the key teeth 112 are connected with the key slots 212, and the terminal 120 is electrically connected with the mating terminal 220.

The housing 110 can be moved between a pre installation position and a final installation position relative to the mating housing 210. When the housing 110 is in the pre installation position, the key teeth 112 are not engaged with the key slots 212 to allow the housing to be rotated relative to the mating housing 210. When the housing 110 is in the final installation position, the key teeth 112 are engaged with the key slots 212 to prevent the housing from being rotated relative to the mating housing 210.

When the locking member 320 is in the locking position, it butts against a rear end face 112*a* of the key tooth 112 to lock the connector 10 to the mating housing 210. When the locking member 320 is in the unlocking position, it is separated from the key teeth 112 to allow the connector 10 to be pulled out of the mating housing 210. The rear end face 112*a* of the key tooth 112 is a vertical plane perpendicular to the axial direction of the connector 10, and the front end face 112*b* of the key tooth is an inclined guide plane inclined axially with the connector to guide the key tooth to insert pass through the locking member 320.

When the housing 110 is in the pre installation position, the locking member 320 is in the unlocking position to allow the connector 10 to be pulled out of the mating housing 210. When the housing 110 is in the final installation position, the locking member 320 is in the locking position to lock the connector 10 to the mating housing 210.

A circumferential groove 202 is formed on the outer wall of the mating housing 210, and the locking device 300 is embedded in the circumferential groove of the mating housing. A through-hole corresponding to the locking member 320 is also formed in the outer wall of the mating housing 210. The locking member 320 extends into the mating housing 210 through the through-hole to be able to engage with the housing 110 inserted into the mating housing.

The locking device 300 also includes a sealing element 340, which is sleeved on the mating housing 210 to seal the circumferential groove 202 on the mating housing. The sealing element 340 prevents water vapor and dust from entering the mating housing 210 through the circumferential groove 202 and the aforementioned through-hole. The sealing element 340 includes a cylindrical elastic body 341. The elastic body 341 has a pressing part 342 corresponding to the pressing member 330, so that the pressing member can be pressed by the pressing part. In an exemplary embodiment of the present invention, an elasticity of the pressing part 342 of the sealing element 340 is higher than that of the other portions of the sealing element. In this way, the elastic ring 310 can be easily deformed by pressing two pressing parts 342 from both sides. An unlocking mark 343 is formed on the pressing part 342 of the sealing element 340, so that the pressing part can be visually identified according to the unlocking mark, which is convenient for the operator in order to perform the unlocking operation.

Figure 14:
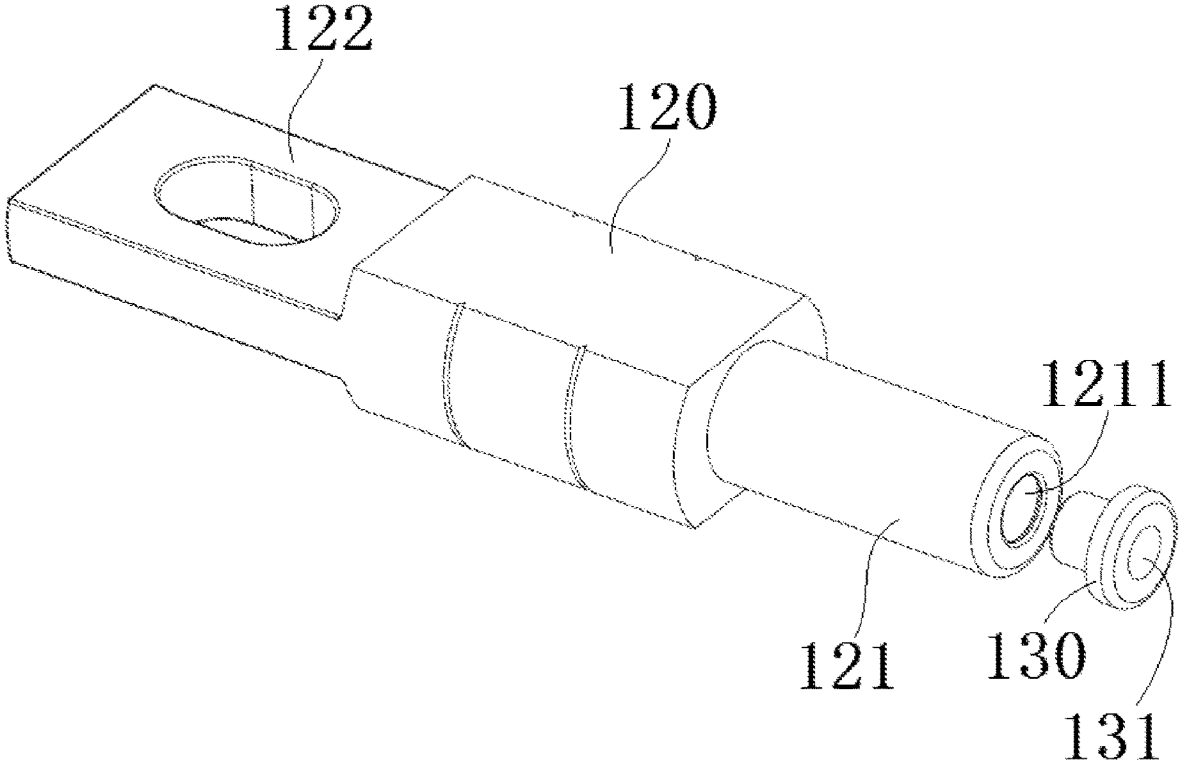
FIG. 14 is an illustrative perspective view of a terminal of a connector according to an exemplary embodiment of the present invention.

FIG. 14 shows an illustrative perspective view of the terminal 120 of a connector according to an exemplary embodiment of the present invention. As shown in FIGS. 7-14, the columnar end 121 of the terminal 120 is adapted to be inserted into the mating terminal 220. The plate end 122 of the terminal 120 may be electrically connected to, for example, a bus bar. The connector 10 also includes an insulating cap 130 mounted on the columnar end 121 of the terminal 120 to prevent human fingers from contacting the end face of the columnar end of the terminal.

A through-hole 131 is formed in the insulating cap 130. The through-hole 131 is sized allow a probe of a detection device to pass through but prohibit human fingers from entering. The probe of the detection device can pass through the through-hole 131 and electrically contact the terminal 120. A mounting hole 1211 is formed in the end face of the columnar end 121 of the terminal 120, and the insulating cap 130 is embedded into the mounting hole.

The mating terminal 220 includes a cylindrical end 221 suitable for mating with the columnar end 121 of the terminal 120 and a crimping end 222 adapted to be crimped onto a conductor of a cable. The mating connector 20 also includes an elastic electrical contact element 223 accommodated in the cylindrical end 221 of the mating terminal 220 and pressed between the terminal 120 and the mating terminal 220 to electrically connect the terminal and the mating terminal.

Still referring to FIGS. 7-14, in the illustrated embodiment, the mating terminal 220 includes a barrel column 211 located in the insertion chamber 201. The cylindrical end 221 and the elastic electrical contact element 223 of the mating terminal 220 are accommodated in the inner cavity of the barrel column 211. The barrel column 211 is inserted into the housing 110. The mating connector 20 also includes a first sealing ring 251. The first sealing ring 251 is sleeved on the barrel column 211 and compressed between the barrel column and the housing 110 to seal the gap between them.

In the exemplary embodiment, the mating housing 210 is L-shaped and includes a first end and a second end perpendicular to the first end. The cylindrical end 221 and the crimping end 222 of the mating terminal 220 are respectively located at the first end and the second end of the mating housing 210. The mating connector 20 also includes a connecting sleeve 230, which is threaded on the second end of the mating housing 210 to fix the cable to the mating housing. The mating connector 20 also includes a second sealing ring 252, which is sleeved on the second end of the mating housing 210 and compressed between the second end of the mating housing 210 and the connecting sleeve 230 to seal the gap between them. The mating connector 20 further includes a sealing sleeve 240, which is accommodated in the connecting sleeve 230 and sheathed on the crimping end 222 of the mating terminal 220 and the cable. The sealing sleeve 240 is compressed between the cable and the connector 230 to seal the gap between them.

In another exemplary embodiment of the present invention, the connector 20 includes the housing 210 and the locking device 300 which is detachably mounted on the housing for locking the connector 20 to the mating connector 10. The locking device 300 comprises the elastic ring 310 and the locking member 320 is fixed on the elastic ring. When the elastic ring 310 is pressed radially from both sides thereof, it can be elastically deformed from an initial state to a pressed state. When the elastic ring 310 is in the initial state, the locking member 320 is in a locking position engaged with the mating connector 10 to lock the connector 20 and the mating connector in the mating state. When the elastic ring 310 is in the pressed state, the locking member 320 is in an unlocking position separated from the mating connector 10 to allow the connector 20 to be separated from the mating connector.

The locking device 300 includes two locking members 320. The two locking members 320 are opposite to each other in one diameter direction of the elastic ring 310. The locking device 300 also includes two pressing members 330 which are fixed to the elastic ring 310 and opposite to each other in another diameter direction of the elastic ring perpendicular to the one diameter direction. When the two pressing members 330 are pressed towards each other, the elastic ring 310 can be elastically deformed from the initial state to the pressed state.

In the illustrated embodiment, the housing 110 may be an integral molded part formed on the terminal 120 by injection molding. Similarly, the mating housing 210 may be an integral molded part formed on the mating terminal 220 by injection molding.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:

a housing having an insertion hole;

a terminal provided in the housing; and a temperature sensor inserted into the insertion hole of the housing and in thermal contact with the terminal to detect the temperature of the terminal, the temperature sensor includes a case having a receiving chamber and a temperature detecting element provided in the receiving chamber of the case, the case is in direct physical contact with a surface of the terminal such that that a heat generated by the terminal is transferred to the temperature detection element.

2. The connector according to claim 1, wherein the temperature sensor comprises:

a pair of wires inserted into the receiving chamber of the case and electrically connected with two pins of the temperature detection element, respectively; and a thermal conductive resin filled in the receiving chamber of the case.

3. The connector according to claim 2, wherein the case comprises:

a top wall;

a bottom wall;

a pair of side walls; and an end wall, the receiving chamber is defined by the top wall, the bottom wall, the pair of side walls and the end wall, and the bottom surface of the bottom wall of the case is arranged directly against the terminal.

4. The connector according to claim 3, wherein a projection is formed on the outer wall surface of the top wall of the case, the projection is in interference fit with a hole wall of the insertion hole of the housing to apply a predetermined pressure on the temperature sensor.

5. The connector according to claim 3, wherein a projection is formed on the hole wall of the insertion hole of the housing, the projection is in interference fit with the top wall of the case and applies a predetermined pressure on the temperature sensor.

6. The connector according to claim 3, wherein a cavity is formed into the top wall of the case and extending in a longitudinal direction of the case between an outer wall surface and an inner wall surface of the top wall to allow the top wall of the case to undergo elastic deformation when pressed.

7. The connector according to claim 3, wherein the insertion hole is an axially extending blind hole formed in the case, and an outer wall surface of the end wall of the case is arranged against a bottom surface of the insertion hole of the housing.

8. The connector according to claim 7, wherein the terminal comprises a columnar end adapted to be inserted into a mating terminal and a plate end adapted to electrically connect with a bus bar, and the bottom surface of the insertion hole is proximate the columnar end of the terminal.

9. The connector according to claim 2, wherein the temperature sensor further comprises a pair of crimping rings for crimping conductors of the pair of wires to the two pins of the temperature detection element.

10. The connector according to claim 2, wherein the temperature detection element is a negative temperature coefficient thermistor.

11. A connector assembly, comprising:

a connector, including:

a housing having an insertion hole;

a terminal provided in the housing; and a temperature sensor inserted into the insertion hole of the housing and in thermal contact with the terminal to detect the temperature of the terminal;

a mating connector adapted to mate with the connector; and a locking device detachably mounted on the mating connector and adapted to lock the connector and the mating connector in a mating state.

12. The connector assembly according to claim 11, wherein the locking device comprises:

an elastic ring; and a locking member fixed on the elastic ring, wherein:

when the elastic ring is pressed radially from both sides of it, the elastic ring is elastically deformed from an initial state to a pressed state;

when the elastic ring is in the initial state, the locking member is in a locking position engaged with the connector to lock the connector and the mating connector in the mating state; and when the elastic ring is in the pressed state, the locking member is in an unlocking position separated from the connector to allow the connector to be separated from the mating connector.

13. The connector assembly according to claim 12, wherein the locking device comprises:

two locking members arranged opposite to each other in one diameter direction of the elastic ring; and two pressing members fixed on the elastic ring and arranged opposite to each other in another diameter direction of the elastic ring perpendicular to the one diameter direction, when the two pressing members are pressed in a direction close to each other, the elastic ring is elastically deformed from the initial state to the pressed state.

14. The connector assembly according to claim 13, wherein:

the housing of the connector has a front end and a plurality of key teeth formed on an outer peripheral surface of the front end; and the mating connector comprises:

a mating housing having an insertion chamber and a plurality of key slots formed on an inner peripheral wall of the insertion chamber; and a mating terminal provided in the mating housing, when the front end of the housing is inserted into the insertion chamber of the mating housing, the key teeth are engaged with the key slots, and the terminal is electrically connected with the mating terminal.

15. The connector assembly according to claim 14, wherein:

the housing is movable between a pre installation position and a final installation position relative to the mating housing;

when the housing is in the pre installation position, the key teeth are not engaged with the key slots to allow the housing to be rotated relative to the mating housing; and when the housing is in the final installation position, the key teeth are engaged with the key slots to prevent the housing from being rotated with respect to the mating housing.

16. The connector assembly according to claim 15, wherein:

when the locking member is in the locking position, the locking member butts against a rear end face of the key tooth to lock the connector to the mating housing; and when the locking member is in the unlocking position, the locking member is separated from the key tooth to allow the connector to be pulled out of the mating housing.

17. The connector assembly according to claim 13, wherein:

a circumferential groove is formed on an outer wall of the mating housing, and the locking device is embedded in the circumferential groove; and a through hole corresponding to the locking member is formed on the outer wall of the mating housing, the locking member extends into the mating housing through the through hole and engages with the housing inserted into the mating housing.

18. The connector assembly according to claim 17, wherein the locking device further comprises a sealing element sleeved on the mating housing and adapted to seal the circumferential groove on the mating housing, the sealing element including a cylindrical elastic body having a pressing part corresponding to the pressing member such that the pressing member is pressable by the pressing part.

19. The connector assembly according claim 14, wherein:

the terminal comprises a columnar end adapted to be inserted into the mating terminal and a plate end adapted to electrically connected to a bus bar;

the connector further includes an insulating cap mounted on the columnar end of the terminal, the insulating cap defining a through-hole adapted to receive a probe of a detection device for electrically contacting the terminal, the through-hole sized to prohibit the passage of a human finger; and a mounting hole is formed on the end face of the columnar end of the terminal, and the insulating cap is embedded in the mounting hole.

20. The connector assembly according to claim 19, wherein:

the mating terminal comprises a cylindrical end adapted to mate with the columnar end of the terminal, and a crimping end adapted to be crimped to a conductor of a cable;

the mating connector further includes an elastic electrical contact element housed in the cylindrical end of the mating terminal and pressed between the terminal and the mating terminal to electrically connect the terminal and the mating terminal;

the mating housing including a barrel column arranged in the insertion chamber, the cylindrical end of the mating terminal and the elastic electrical contact element contained in the inner cavity of the barrel column, and the barrel column is inserted into the housing; and the mating connector further includes a first sealing ring sleeved on the barrel column and compressed between the barrel column and the housing and sealing a gap therebetween.

21. A connector, comprising:

a housing having an insertion hole;

a terminal provided in the housing; and a temperature sensor inserted into the insertion hole of the housing and in thermal contact with the terminal to detect the temperature of the terminal, the temperature sensor includes a case having a receiving chamber, a temperature detecting element provided in the receiving chamber of the case, and a pair of wires inserted into the receiving chamber of the case and electrically connected with two pins of the temperature detection element, respectively.

* * * * *